(12) United States Patent
Lee et al.

(10) Patent No.: US 8,395,708 B2
(45) Date of Patent: Mar. 12, 2013

(54) METHOD AND SYSTEM FOR DETECTION AND ENHANCEMENT OF VIDEO IMAGES

(75) Inventors: Louie Lee, Toronto (CA); Vladimir Lachine, Toronto (CA); Greg Smith, Toronto (CA)

(73) Assignee: Qualcomm Incorporated, San Diego, CA (US)

(*) Notice: Subject to any disclaimer, the term of this patent is extended or adjusted under 35 U.S.C. 154(b) by 261 days.

(21) Appl. No.: 12/840,973

(22) Filed: Jul. 21, 2010

(65) Prior Publication Data

US 2011/0019096 A1 Jan. 27, 2011

Related U.S. Application Data

(60) Provisional application No. 61/227,422, filed on Jul. 21, 2009.

(51) Int. Cl.
*H04N 5/21* (2011.01)
(52) U.S. Cl. .................................................. 348/625
(58) Field of Classification Search .................. 348/625, 348/618, 606–607, 558, 699, 700, 673, 674, 348/678, 687, 441, 448; 382/274, 254, 173, 382/167, 275; 375/240.01, 240.02
See application file for complete search history.

(56) References Cited

U.S. PATENT DOCUMENTS

| | | | |
|---|---|---|---|
| 5,048,095 A * | 9/1991 | Bhanu et al. | 382/173 |
| 6,295,369 B1 | 9/2001 | Gordon | |
| 6,614,930 B1 | 9/2003 | Agnihotri et al. | |
| 7,352,410 B2 | 4/2008 | Chou | |
| 7,408,986 B2 * | 8/2008 | Winder | 375/240.12 |
| 7,558,320 B2 * | 7/2009 | Winder et al. | 375/240.12 |
| 7,916,214 B2 * | 3/2011 | Kimura et al. | 348/558 |
| 8,018,501 B2 * | 9/2011 | Sasaki | 348/223.1 |
| 8,111,943 B2 * | 2/2012 | Jobson et al. | 382/274 |
| 8,125,569 B2 * | 2/2012 | Flores et al. | 348/672 |
| 8,155,465 B2 * | 4/2012 | Cho et al. | 382/254 |
| 8,218,087 B2 * | 7/2012 | Lo et al. | 348/673 |

(Continued)

FOREIGN PATENT DOCUMENTS

WO  WO 01/63558 A2  8/2001

OTHER PUBLICATIONS

PCT International Search Report and the Written Opinion mailed Sep. 16, 2010, in related International Application No. PCT/US2010/042790.

(Continued)

*Primary Examiner* — Paulos M Natnael
(74) *Attorney, Agent, or Firm* — Haynes and Boone, LLP

(57) ABSTRACT

A method and a system for adaptive image enhancement are provided for measuring the image quality of a pixel region in a frame, performing an image classification based on the image quality measurement, and enhancing image quality by applying operations according to image classification of the region. Also provided is a method as above including the steps of dividing a frame into P pixel regions; and for each one of the pixel regions measuring the image quality; assigning an image quality class; and enhancing the image. Also provided is a system for adaptive image enhancement including a circuit to measure the image quality of a pixel region in a frame in a source video image; a circuit to perform an image classification of the region based on the image quality measurement; and a circuit to enhance the image quality of the region in the source video image a by applying operations based on the image classification of the frame.

28 Claims, 9 Drawing Sheets

U.S. PATENT DOCUMENTS

| | | |
|---|---|---|
| 2004/0017579 A1 | 1/2004 | Lim |
| 2005/0074180 A1 | 4/2005 | Wilensky |
| 2006/0182361 A1* | 8/2006 | Ptucha et al. ............. 382/254 |
| 2007/0002080 A1* | 1/2007 | Ishizaka ................. 345/660 |
| 2007/0286499 A1 | 12/2007 | Freiburg et al. |
| 2008/0317379 A1* | 12/2008 | Steinberg et al. ......... 382/275 |
| 2009/0252411 A1* | 10/2009 | Siddiqui et al. ........... 382/167 |

OTHER PUBLICATIONS

Supplementary European Search Report mailed Jan. 8, 2013, in related European Patent Application No. 10802869.7.

* cited by examiner

METHOD AND SYSTEM FOR DETECTION AND ENHANCEMENT OF VIDEO IMAGES

CROSS-REFERENCE TO RELATED APPLICATIONS

This application relates, and claims priority, to U.S. Provisional Patent Application No. 61/227,422, filed Jul. 21, 2009, the disclosure of which is incorporated by reference, in its entirety here for all purposes.

BACKGROUND

1. Field of the Invention

The embodiments described herein relate generally to video processing circuits and methods; and more particularly, to circuits and methods for measuring and enhancing the quality of a video image.

2. Description of Related Art

With increasing proliferation of video content from numerous sources in various resolution formats and compression methods, the image quality of the content will vary substantially. Some of the image quality issues may include excessively low or high contrast, excessively low or high brightness, soft or low bandwidth image, a varying amount of random noise, and image compression schemes that result in "mosquito" and "block" noise. Existing video and image processing technologies are available to adjust image brightness and contrast, to sharpen and enhance image detail, and to reduce temporal noise and compression artifacts. However, the user needs to adjust parameters of these technologies according to each input source, for example according to high resolution Bluray player, low resolution portable media player, or according to variances in native and up-converted content in broadcast TV. Internet content can be more varied in resolution and compression. In this situation, some users may not fully comprehend the technologies to use them effectively or may not be motivated, or may not respond quickly enough to constantly make adjustments. Therefore, there is a need for a video image processor that can adapt to the content and perform necessary compensation for optimum video quality.

SUMMARY

A method and a system for adaptive image enhancement are provided. A method according to some embodiments of the present invention includes measuring the image quality of a pixel region in a frame in a source video, performing an image classification based on the image quality measurement, and enhancing the image quality of the pixel region in the source video image by applying operations based on the image classification of the frame.

Also provided is a method for adaptive image enhancement including the steps of dividing a frame in a source video image into P pixel regions, where P is a number greater than 1 and as large as the total number of pixels in the output display; and for each one of the P pixel regions the method may further include the steps of measuring the image quality of the pixel region in the frame of a source video image; assigning an image quality class to selected portions of the pixel region; and enhancing each of the pixel regions in a frame of a source video image according to their image classification.

A system for adaptive image enhancement according to some embodiments of the present invention includes a circuit to measure the image quality of a region of a frame in a source video image; a circuit to perform an image classification of the region based on the image quality measurement; and a circuit to enhance the image quality of the region in the source video image by applying operations based on the image classification of the frame.

These and other embodiments of the present invention are further described below with reference to the following figures.

BRIEF DESCRIPTION OF THE DRAWINGS

In the figures, elements having the same reference number have the same or similar functions.

DETAILED DESCRIPTION

Video content such as high definition (HD) television may contain images of native resolution (1920×1080 pixels in HD) or other resolutions such as standard definition (SD), having 720×480 pixels, up-sampled to HD resolution. Although such up-sampled images may have high pixel resolution, their actual spectrum may have its original range, and not that of the up-sampled resolution. According to some embodiments of the present invention an analysis of the image's spectral histogram can determine the inherent resolution of the image. A spectral measurement can be performed by use of either bandpass filters or by a Discrete Cosine Transform (DCT) and can be performed in one or two dimensions, according to some embodiments of the present invention.

Furthermore, some video applications may benefit from a differential approach to the adjustment of image quality across an entire frame, according to some embodiments of the present invention. For example, different portions of the frame, regions or objects, may require different types of enhancement. Such blocks or portions of the frame may also include image objects such as a portion of the sky, or a section of grass, or a portion of water. While a region may include a low detail section having a noisy background such as a portion of sky, another region may include a highly detailed portion showing diffuse edges, such as grass, plants, or trees in a forest. A frame including such regions may benefit from different enhancement approaches for each sub-frame, resulting in an image having high quality across the entire frame. This approach can make a more effective use of computational capabilities in high-end video systems. Thus, a more effective video enhancing method and system may be obtained in some embodiments of the invention that operate in real time, with no effect on perception of the video stream by the observer.

Some embodiments of the present invention may provide a method for dividing a frame in a source video image into P pixel regions, where P is a number greater than 1 and as large as the total number of pixels in the output display; and for each one of the P pixel regions the method may further include the steps of measuring the image quality of the pixel region in the frame of a source video image; assigning an image quality class to selected portions of the pixel region; and enhancing each of the pixel regions in a frame of a source video image according to their image classification.

Figure 1:
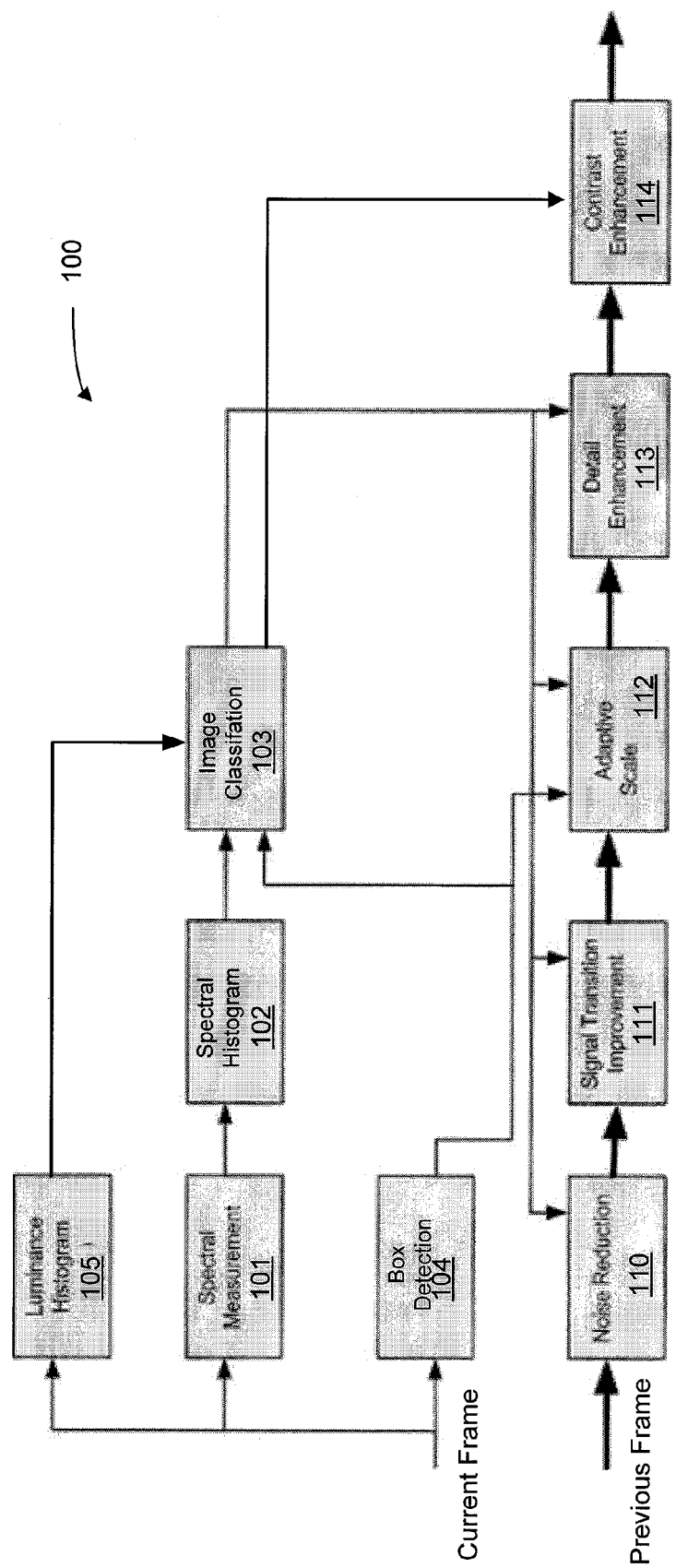
FIG. 1 shows a block diagram of a system according to some embodiments of the present invention.

FIG. 1 shows an Adaptive Image Enhancement System (AIE) 100 according to some embodiments of the present invention. AIE system 100 includes measurement functions such as spectral filter 101, spectral histogram 102, box detector 104, and luminance histogram 105. System 100 also includes classification functions such as image classification function 103. System 100 further includes image processing functions such as noise reducer 110, signal transition improvement function 111, adaptive scaler 112, detail enhancement function 113, and contrast enhancement function 114. System 100 as depicted in FIG. 1 may include one or more of the image processing functions shown. Other embodiments of the present invention may not be restricted to the image processing functions shown in FIG. 1. Also, in some embodiments the order of the image processing functions may not be as shown in FIG. 1, the processing order varying with application or user preference.

In some embodiments of system 100, measurement functions are performed during the source input frame time. The measurements may be analyzed prior to the next frame time, and the image enhancement may be applied to the source frame during the next frame display time. Thus, according to some embodiments of the present invention the measurement, analysis, and enhancement may be performed in the same source frame. Some embodiments may have additional delays in measurement, analysis and image enhancement due to other processing or system functions.

Video source data may be in either RGB or YCrCb (YUV) format. Some embodiments of the present invention perform measurement and processing in YCrCb format and start from the assumption that RGB sources are converted prior to being processed by AIE system 100. While some embodiments of the present invention may perform measurements, analysis and enhancement with RGB data, some embodiments may use a YCrCb format. The YCrCb format is a chromatic format of video sources that closely represents the human visual system, thus some embodiments of the present invention may use a YCrCb format. Some embodiments of the present invention may also use data in HSI format (H-hue, S-saturation, I-intensity). According to some embodiments of the present invention, a YCrCb format or an HSI format may be referred to as a 'color space'. The current input frame data is concurrently received by spectral measurement 101, box detector 104, and luminance histogram 105 (cf. FIG. 1), for parallel measurement processing.

Spectral measurement stage 101 performs spectral decomposition of the source video image. The spectral decomposition can be carried through separately for each of the Y, Cr and Cb signals in the YCrCb format, according to some embodiments of the present invention. In some embodiments of the present invention, this spectral decomposition may be provided by a Fourier transform (FT), or a fast Fourier transform (FFT) of the signal (Y, Cr, and Cb). Furthermore, the FT of the signal (Y, Cr, and Cb) may be a two-dimensional Fourier transform (2D-FT or 2D-FFT), according to some embodiments of the present invention. Hereinafter, any reference to 'frequency', 'frequency band', or 'spectral measurement' will be related to the spatial Fourier frequency or the spatial Fourier transform of the source video image input, according to some embodiments of spectral measurement stage 101, unless otherwise expressed.

The image frequency spectrum may be separated into multiple select bands for measurement. Some embodiments of the present invention use a combination of frequency demodulation and low pass filtering to select the spectral band for measurement. Some embodiments use bandpass filters or a Discrete Cosine Transform (DCT) to perform spectral filtering functions.

In some embodiments of spectral measurement 101, a spectral decomposition may be performed with one (1) or more bandpass filters. To reduce implementation costs, a smaller number of bandpass filters (e.g. 1) may operate sequentially through each of the selected number of spectral bands (e.g. 4), over different regions of an image and over a number of frames. Thus, full frame statistics may be accumulated to provide stable and reliable results. Some embodiments of the present invention include spectral measurement 101 and spectral histogram 102 performed only in the horizontal direction, thereby providing a reduced implementation cost. Some embodiments of the present invention may perform spectral measurement 101 and spectral histogram 102 in both horizontal and vertical directions, thus providing additional accuracy for more reliability and consistency of the measurements. The additional measurements in the vertical direction may detect objects that are horizontally oriented and appear to the horizontal filter as low bandwidth objects, thus providing a more robust implementation. The vertical spectral measurements can be used in correlation with, or independent of, the horizontal spectral measurements, thereby enabling vertically specific image enhancements.

Spectral measurement 101 is divided into frequency bands of interest that may be selected empirically or specifically, detecting quality of content and correlating quality with the frequency band of enhancements. For example, when a 1080p HD signal is received, it may be of native resolution 1920× 1080 or up-scaled from various sources such as Compact Disk digital video (VCD), the National Television System Committee (NTSC, for analog television systems), digital video disk (DVD), or 720p (HDTV with 720 pixels of vertical resolution).

If the native bandwidth of 1080p HD is 'Fs' then the above mentioned up-scaled contents (VCD, NTSC, DVD, and HDTV) will have bandwidths limited to 0.188×, 0.25×, 0.38× and 0.67× of Fs, respectively. In this example, 4 filters may be set for bandpass to evaluate content quality: $B_1$ from 0.188× to 0.25×, $B_2$ from 0.25× to 0.38×, $B_3$ from 0.38× to 0.67× and $B_4$ from 0.67× to 1.00×Fs. In connection with an up-converted NTSC signal, or a video recorder signal (VCR), which are analog video formats, spectral measurement stage 101 may further include a spectral filter that performs detection of the analog color carrier, with a transmission frequency of 3.58 MHz (in NTSC format), according to some embodiments of the present invention. Spectral measurement stage 101 is then provided with a suppression circuit that is turned 'on' to eliminate color artifacts when required.

Some embodiments of the present invention include stage 101 performing spectral measurements of the chrominance channels Cr and Cb, and performing additional or independent processing. Cr and Cb bandwidths are typically 0.5×Fs of the Y signal, except if the source is graphics video, in which case Cr and Cb bandwidths are the same as the Y signal, or if the source is NTSC or VCR, in which case the bandwidths are constrained below 1.5 MHz. With this video content, the Cr and Cb components may be filtered to reduce out of band noise and artifacts. In this embodiment the Cr and Cb components may include a continuous spectral band with equal intensity across the band. If full bandwidth chrominance is detected, these filters can be turned 'off' to maintain full bandwidth and not soften the Cr and Cb components. If the video chrominance components (Cr and Cb) have been band-limited, this may indicate a timing mismatch between the Y and the Cr/Cb channels. To correct this, some embodiments of the present invention include delay compensation circuits that enable signal transition enhancement, matching Cr and Cb edge transitions to Y edge transitions. Thus, phase delays in Cr and Cb channels may be compensated.

One embodiment may implement N spectral band filters in stage 101 for coverage of N spectral bands of interest. A lower cost embodiment of the present invention may use a reduced number of filters, M, to measure N spectral bands, further dividing the image into sub-frames and accumulating measurements over N/M frames. In this lower cost embodiment the filter parameters are sequentially changed and measurement histograms are accumulated for M bands in each sub-frame until full frame coverage for each band is obtained over a number of frames. An exemplary embodiment may use two (2) filters to cover four (4) spectral bands so the image can be segmented into two sub-frames. The first filter may cover bands 1 and 2 in the first sub-frame and the second filter may cover bands 3 and 4 in the second sub-frame. In the next frame from the video stream, the second filter may cover bands 3 and 4 on the first sub-frame and the first filter may cover bands 1 and 2 on the second sub-frame.

Spectral histogram 102 receives the output from the spectral measurement stage 101 and accumulates histogram data for N spectral bands in M sub-frames over a number of frames. In some embodiments, for an implementation of 4 spectral bands and 4 sub-frames, a histogram for all four spectral bands over the whole image may be available after processing a set number of frames, for example four (4). In some embodiments of the exemplary case mentioned above, the histogram is read after a given number of frames are fully updated. In other embodiments, the histogram is read every frame, with a partial update including accumulation of data from the previously given number of frames. In some embodiments the vertical regions of each band can be further divided in horizontal segments for greater granularity, to provide a more detailed analysis. The division of the frame in sub-frames provides more granular results in spectral histogram 102, so local variance can be observed.

From the measured spectral histogram 102, the spectral amplitude, distribution, and range can be used to classify images in terms of types such as low, medium, or high contrast; low, medium or high brightness, low, medium, or high bandwidth; and low, medium, or high level of detail. These classifications can be used to control the selected type and level of video processing to enhance the image, and are performed in image classification stage 103.

Some embodiments of the present invention apply image classification stage 103 at a global level, including a full frame of the video image to be processed. Furthermore, image classification 103 can be applied in a region and also at a pixel level, according to some embodiments. The pixel region may be selected from the full frame, as any sub-frame region contained within the full frame, wherein a sub-frame can be any size from a single pixel within the frame to the full frame, according to some embodiments of the present invention. The region or pixel level classification may generate a 2D classification map that defines regions or pixels that are highly detailed, poorly detailed, high or low contrast, high or low brightness, sharp edges, or flat regions. This image map may be used by other processing functions to control and vary the display operation.

Image classification stage 103 evaluates the histogram data for each band, region, and portion within a particular region, to determine the quality of the content. In some embodiments, image classification stage 103 may be implemented by software on a microprocessor, for flexibility of implementation. Some embodiments of the present invention may use a local image classification stage 607 by partitioning the measurements over regional areas with separate histograms (cf. FIG. 6, below). The local measurement provides greater adaptability to variance in image content and may be used to perform local image enhancements.

In some embodiments of the present invention, image quality and resolution is classified by the absolute power of each spectral band and the relative power between the spectral bands as measured at stage 101. The band power over noise is determined by a threshold established empirically. For example, a threshold may be the ratio of absolute power level to filter noise power, or quantization-induced band power. A second exemplary threshold may be the relative ratio of band power to the total power from all bands, independently of image brightness and contrast. Since the power calculated is resolution dependent, these thresholds are also adapted according to input resolution, thereby providing a resolution independent threshold.

Box detection stage 104 in FIG. 1 may be implemented to adjust the aspect ratio and resolution of the original source content to the display aspect ratio and resolution. To display the source in the original aspect ratio, the image may be placed in a 'letter box' or 'pillar box' where the inactive display areas are set to a flat color. An SD video may have a 4:3 or 16:9 aspect ratios. Additionally, an SD video having 4:3 aspect ratio may contain within it a 'letter box' which has a 16:9 aspect ratio, or a 2:35 aspect ratio image. An SD or HD video having 16:9 aspect ratio may further contain a 'pillar box' with a 4:3 aspect ratio image. Thus, when an SD video is up-converted to HD, the active image area may be smaller than the display area and the inactive area may be set to a flat color, or black. In broadcast video, the content is constantly changing with sequences in varying formats of 'letter box', 'pillar box', and 'letter box' within a 'pillar box'. In this scenario, the active image area may be scaled and by user preference expand the image, thus maximizing the displayed image, or filling the display area, or reducing the flat borders.

Box detection stage 104 is implemented to evaluate the top, bottom, left, and right borders of the image and to measure its size. The size is determined by detection of the number of rows and columns of black or flat color around the image so that the detected border has no motion. Black or flat color areas can be determined by a decision threshold of filtered adjacent pixel differences, to avoid errors from noise. Another method for box detection according to some embodiments of the present invention is the use of color keying, where colors between the specified key values are considered the same, thus forming a flat color area. The detection and size of the top and bottom borders, and the left and right borders may be correlated to the possible up-sampling formats and to make the desired scaling adjustments. The box detection information may be passed to other measurement and processing functions to mask its operation to the active region. Potential scenarios that could affect the box detection decision include dark and blank scenes. To prevent this, some embodiments of the present invention are provided with switchover decisions that include detection of blank or dark scenes in the active image area to reduce false detection.

Also shown in FIG. 1 is noise reduction stage 110. Stage 110 is implemented to operate according to the image classification results obtained in stage 103. The noise reduction level may be adjusted so that its strength is less for high resolution content to minimize detail loss, and is higher for low resolution content so noise attenuation is more aggressive for the whole image. This applies for either random temporal noise or compression artifacts, such as "mosquito" or "block" noise. Noise reduction stage 110 can be gated within an area detected by box detector 104, and provide higher noise reduction levels in the detected borders.

FIG. 1 further depicts signal transition improvement stage (STI) 111. Stage 111 enhances transition of signal edges that may be degraded. In some embodiments of the present invention, this degradation may be the result of bandwidth limitations in the transmission frequency of the video signal. These limitations normally occur in analog video platforms such as NTSC and phase alternating line (PAL) encoding. Low resolution content may also be the cause for degradation of the transition of signal edges even in digital video format such as upscale images, according to some embodiments. In some embodiments of the present invention, STI stage 111 supports enhancement of three (3) spectral bands on all three components (as in Y, Cb, and Cr). These bands may be associated with the expected source content and with the spectral bands set in spectral measurement stage 101, or may be set to a predetermined value such as 0.12×, 0.25×, and 0.50× of Fs. The use of different frequency bands for image enhancement may reduce the recurrence of imaging artifacts. Some artifacts may occur due to enhancement of the high frequency end in a low bandwidth signal, which would increase noise components. Other artifacts may occur due to enhancement of the low frequency end in a high band signal, which may introduce spurious contours on gradients. Based on the image classification received, STI stage 111 can adaptively adjust enhancements to the luminance and chrominance components independently, according to some embodiments of the present invention. In some embodiments of the present invention including video data with analog content (e.g. NTSC, VCR or PAL), the Cr and Cb classifications provided by stage 103 may be set at low. Thus, a low band in STI stage 111 would be enabled. In some embodiments of the present invention the Y classification provided by stage 103 may be set at 'medium,' so the medium band of the STI is enabled. In some embodiments of the present invention, STI 111 enhancements may be gated by a pre-selected area detected in box detector 104.

In some embodiments of the present invention, different input video frames may be processed in three spectral bands, set as 0.12×, 0.25×, and 0.50× of Fs, for improvement of the luminance component, Y. In some embodiments, different input video frames may be processed in three spectral bands, set as 0.12×, 0.25×, and 0.50× of Fs, for improvement of one the chrominance components such as Cb or Cr.

Figure 2:
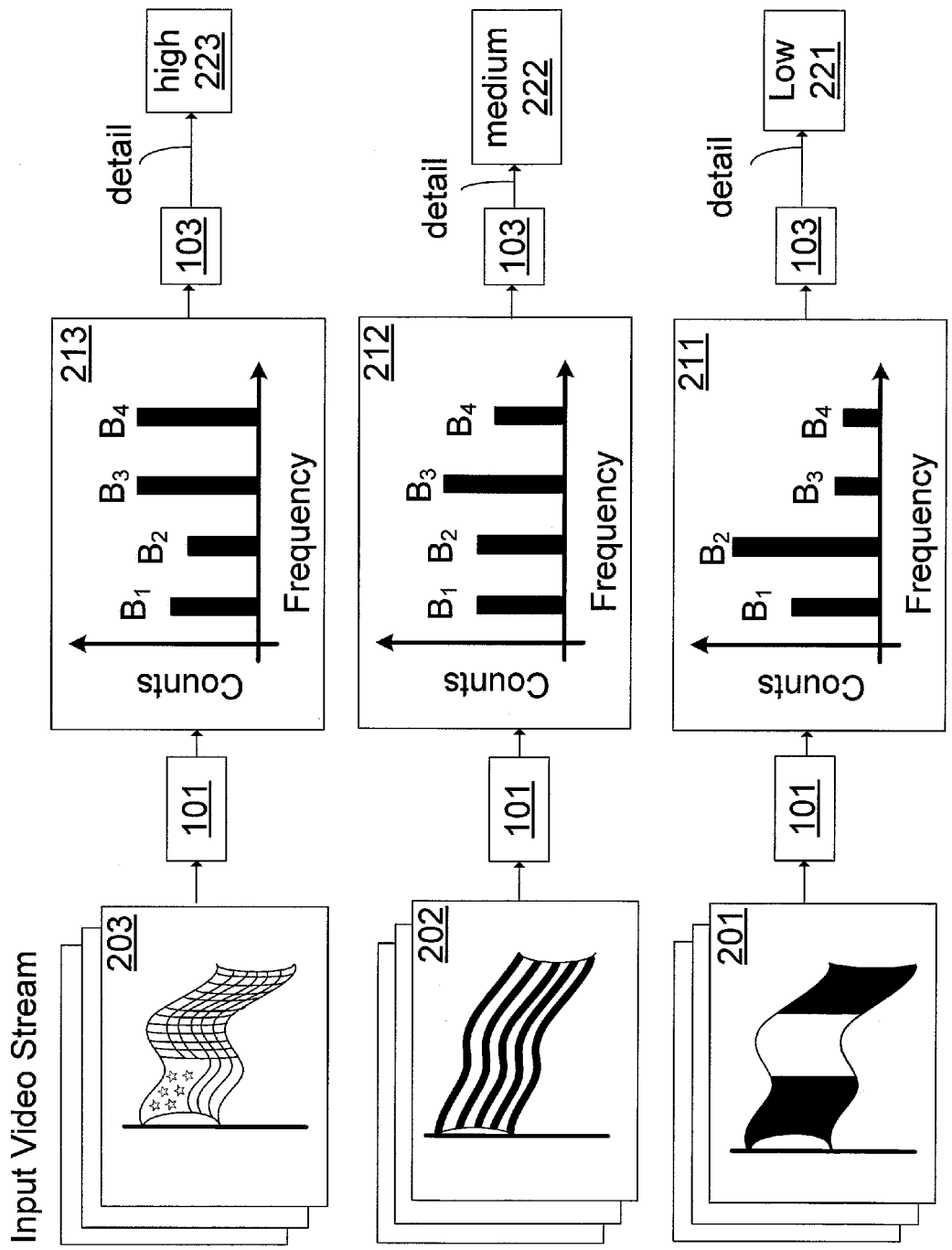
FIG. 2 shows image classification according to detail using spectral histogram, according to some embodiments of the present invention.

FIG. 2 shows how the data from an input video stream is processed by spectral measurement stages 101, 102, and 103 to provide an image classification output, according to some embodiments of the present invention. In particular, FIG. 2 shows input video streams having frames 201, 202, and 203 with increasing level of detail in the image. Note that according to the embodiment depicted in FIG. 2 stage 101 performs measurements using four spectral bands, $B_1$, $B_2$, $B_3$, and $B_4$ covering increasingly higher frequency bands. The results of stage 101 are input to stage 102 to provide histograms 211, 212, and 213, corresponding to frames 201, 202, and 203, respectively. FIG. 2 shows that frame 203 produces a histogram 213 having a larger number of components in the high frequency bands $B_3$ and $B_4$, as compared to less detailed frames 202 and 201. Moreover, frame 201, including a design with three vertical stripes, results in histogram 211 having a low number of components in the high frequency band $B_4$, and a proportionally higher number of components in the lower frequency bands $B_2$ and $B_1$. Frame 202 includes a design that is more detailed than frame 201, but less detailed than frame 203. Histogram 212 reflects this fact by showing a more even distribution among the different frequency bands $B_1$-$B_4$. The results from classification stage 103 may be 'low' detail in output 221 for frame 201, 'medium' detail in output 222 for frame 202, and 'high' detail 223 in output 223 for frame 203 according to some embodiments of the present invention. Note that outputs 221, 222, and 223 may be different in the next frame provided by the three input video streams depicted in FIG. 2.

Figure 3:
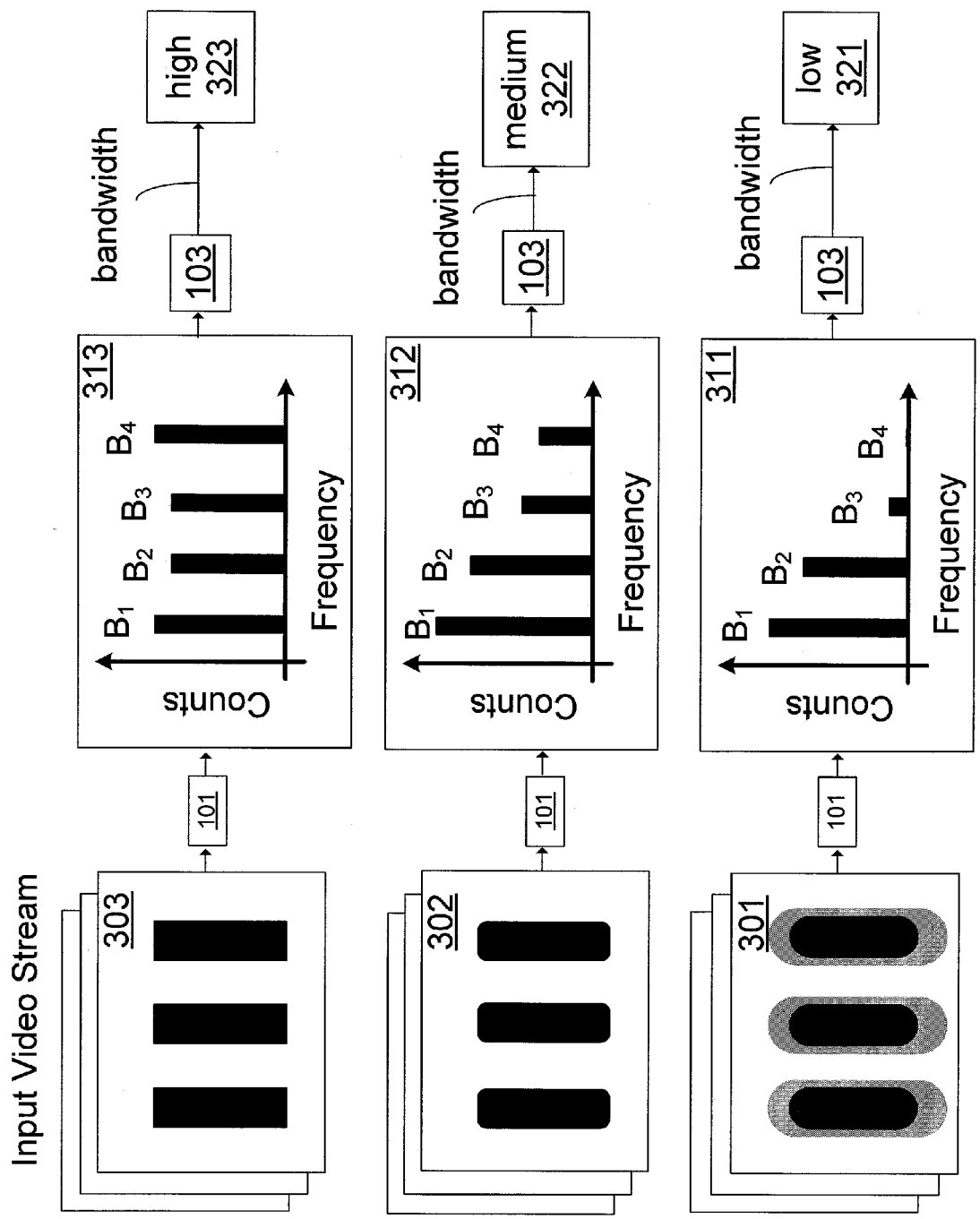
FIG. 3 shows image classification according to bandwidth using spectral histogram, according to some embodiments of the present invention.

FIG. 3 illustrates an embodiment of the present invention in which the output from spectral histogram stage 102 is used by image classification stage 103 to provide a global classification of an input frame according to bandwidth: low, medium and high. Three different input video streams are shown, with frames 301, 302, and 303 depicting a similar pattern but having different 'sharpness' around the edges of the patterns. Using filters for bands $B_1$, $B_2$, $B_3$, and $B_4$, stage 101 measures the spectral contents of each frame and inputs the results to histogram stage 102. Stage 102 provides histograms 311, 312, and 313 corresponding to frames 301, 302, and 303, respectively. Frame 303, having sharper edges relative to frames 302 and 301, results in histogram 313 having a more even distribution of frequency components relative to histograms 312 and 311, including higher frequency bands $B_3$ and $B_4$. Histogram 312 shows decreased amplitude in the high frequency components $B_3$ and $B_4$ relative to low frequency components $B_1$ and $B_2$. Histogram 312 is the result of frame 302, which has features that are less sharp than those of frame 301. Histogram 311 shows almost zero amplitude in the highest frequency band $B_4$, low amplitude in frequency band $B_3$, and higher amplitudes at low frequency bands $B_1$ and $B_2$. Accordingly, histogram 311 corresponds to frame 301, showing round edges instead of the sharp edges of frame 303. The result of image classification stage 103 in the embodiment depicted in FIG. 3 is thus 'high' bandwidth output 323 for frame 303, 'medium' bandwidth output 322 for frame 302, and 'low' bandwidth output 321 for frame 301. Note that output 323, 322, and 321 may be different in the next frame from input video streams depicted in FIG. 3.

Referring back to FIG. 1, luminance histogram stage 105 provides results that can be used to evaluate the classification threshold in the image classification stage 103, according to some embodiments of the present invention. The luminance histogram stage 105 creates a histogram of the Y signal received for each pixel within a preselected region of the frame. In some embodiments, the preselected region may include the entire frame. The classification output to inform image processing functions includes, but is not limited to low, medium, or high contrast and low, medium, or high brightness.

Figure 4:
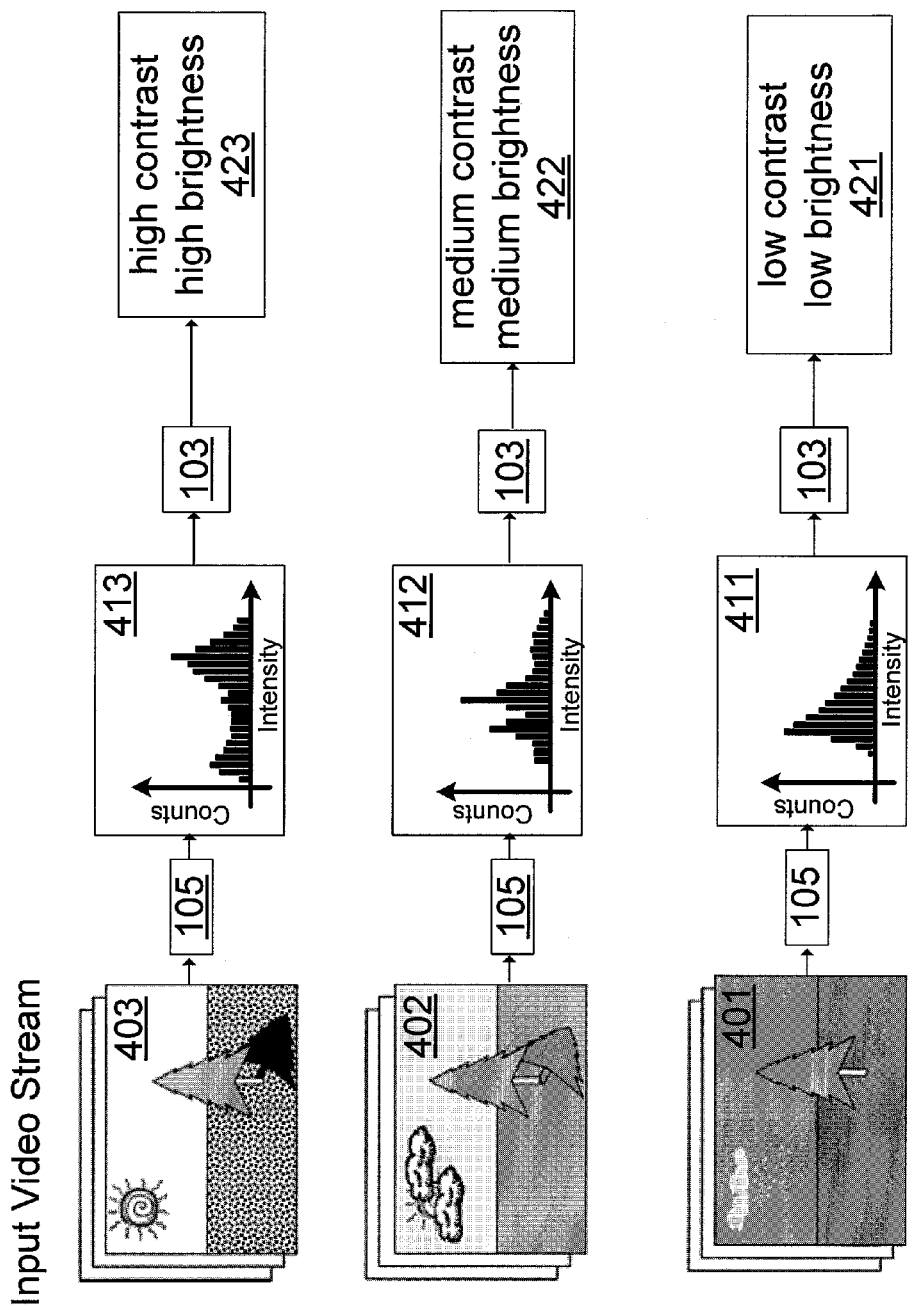
FIG. 4 shows image classification according to contrast and brightness using luminance histogram, according to some embodiments of the present invention.

FIG. 4 shows an example where three different input video frames are processed by luminance histogram 105 and image classification stage 103 to determine low, medium and high luminance levels, according to some embodiments of the present invention. In some embodiments of the present invention a bi-modal histogram may indicate the presence of high contrast levels. A broad, normal distribution or a continuous distribution may indicate average brightness and high contrast, and a central distribution may indicate average brightness with lower contrast. Furthermore, the sum of all the bins in the histogram may be an indication of the absolute brightness in the frame, and the distribution of the bin amplitudes may indicate the contrast range of the image, according to some embodiments of the present invention. Other measures of brightness may use a certain threshold in intensity. Thus, the sum of the bins above the threshold may be compared to the sum of the bins below the threshold to provide a measure of brightness.

FIG. 4 shows an example where input video frames 401, 402, and 403 are processed by luminance histogram 105 and image classification stage 103 to determine 'low' 421, 'medium' 422, or 'high' 423 luminance contrast and brightness. Different input video streams provide frames 401, 402 and 403. As a result, stage 105 produces histograms 411, 412, and 413 using the luminance component in frames 401, 402 and 403. As described above, histogram 413 shows the features of a high brightness, high contrast image included in frame 403, namely a wide luminance distribution and weighted toward the high intensity end. Accordingly, stage 103 assigns to frame 403 a 'high' contrast and brightness output 423. The image in frames 402 and 401 gradually loses contrast and brightness. The sun is partially covered by clouds in frame 402 and disappears altogether in frame 401. The shadow cast by the tree dwindles in frame 402 and vanishes in frame 401. Thus result histograms 412 and 411 from frames 402 and 401, respectively. Histograms 412 and 411 show a progressive distribution narrowing and a shift towards lower intensity levels. Thus, stage 103 assigns 'medium' and 'low' contrast and brightness outputs 422 and 421 to frames 402 and 401, respectively. As in the case of FIGS. 2 and 3 above, outputs 423, 422 and 421 may change for the next frame provided by the input video streams. According to the embodiments of the present invention shown in FIG. 4, histograms 411, 412, and 413 may have approximately the same integrated number of counts. That is, a histogram showing a broader spectrum, such as histogram 413, may have lower size in each of the bars, while a histogram showing narrower peaks such as histogram 412, may have higher size in some of the bars at the center of the peaks. According to embodiments of the present invention such as depicted in FIG. 4, the integrated sum of the bars in each of the histograms represents the total number of pixels being considered within a frame or region of a frame in the image.

Referring back to FIG. 1, adaptive scaler 112 performs the function of scaling the input image to the resolution required for the output image. Adaptive scaler 112 may receive image format information detected by box detection stage 104 and adjusts the position and scaling factor on the source image to the selected output format that is adaptively filled.

FIGS. 5a-d show several examples of a source image format, a normally scaled output format, and an adaptively scaled output format as processed by box detection stage 104 and adaptive scaler 112, according to some embodiments of the present invention. Adaptive scaler stage 112 uses the input from image classification stage 103 to adjust the filter response. For example, scaler 112 reduces the bandwidth with low quality sources so that noise and artifacts are reduced. Also, scaler 112 may increase the bandwidth for high quality sources, for optimum and flat bandpass reproduction.

Figure 5A:
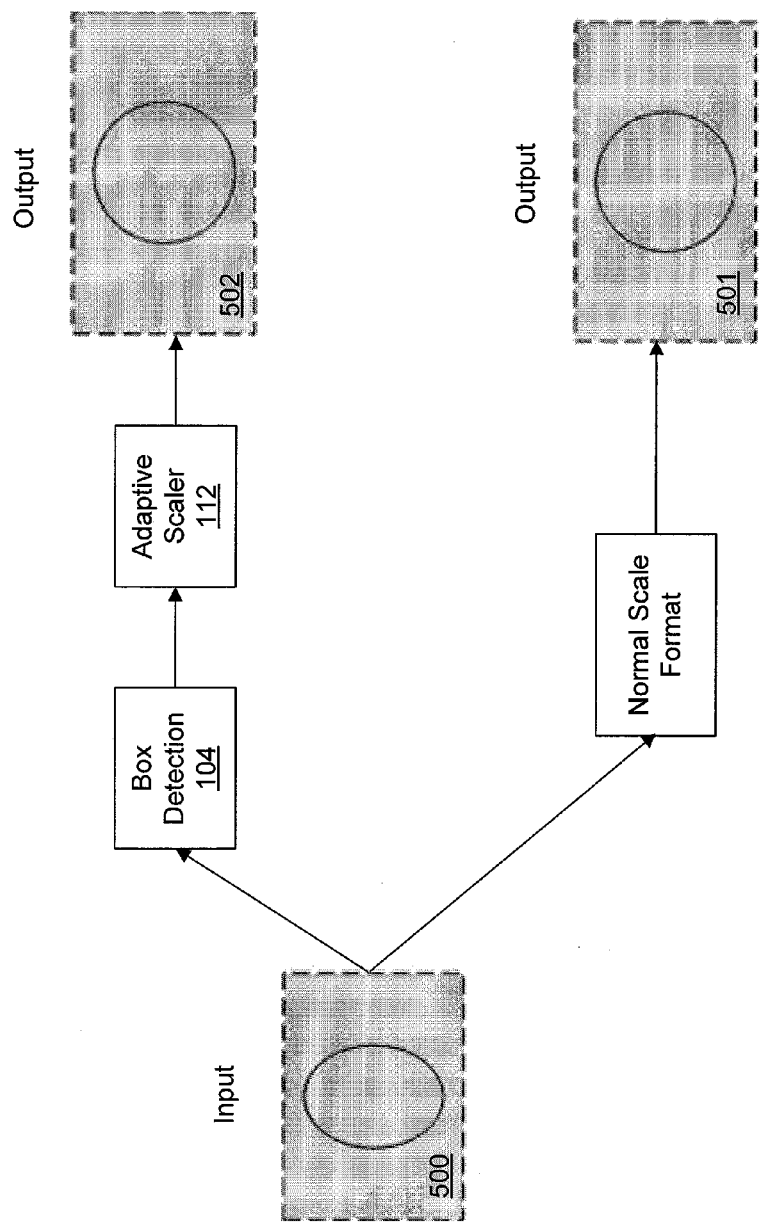
FIG. 5a shows a standard definition input video image having a 16:9 aspect ratio with 16:9 content.

FIG. 5a illustrates SD input video image 500 having a 16:9 aspect ratio with 16:9 content. Frame 501 shows the recovery of a circle, according to a normally scaled format. Frame 500 does appear to be horizontally squeezed to indicate that SD video may be encoded as 720×480 pixel frame with non-square pixel aspect ratio for both 16:9 and 4:3 aspect images. Frame 502 shows the result of using an adaptively filled output format in scaler 112.

Figure 5B:
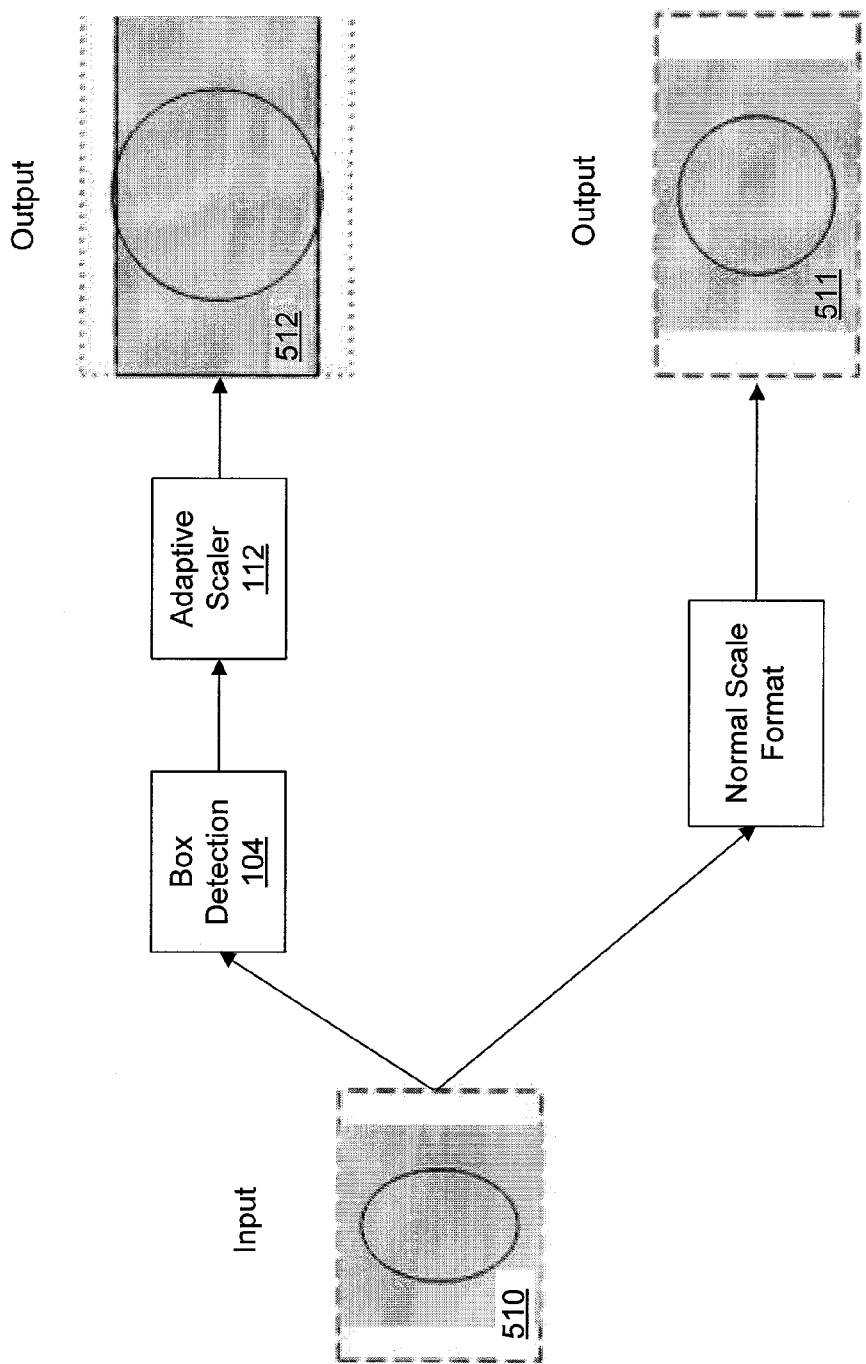
FIG. 5b illustrates a standard definition input video image having 16:9 aspect ratio with 4:3 'pillar box' content.

FIG. 5b illustrates SD input video image 510 having 16:9 aspect ratio with 4:3 'pillar box' content. Frame 511 shows that areas of the display may remain empty when a normally scaled format is used. Frame 512 shows that in the case of a 'pillar box' content the procedure in box detection stage 104 and adaptive scaler stage 112 is to expand the image to fill the display area horizontally. At the same time, the vertical portion that overlay the display is cropped, as shown in frame 512.

Figure 5C:
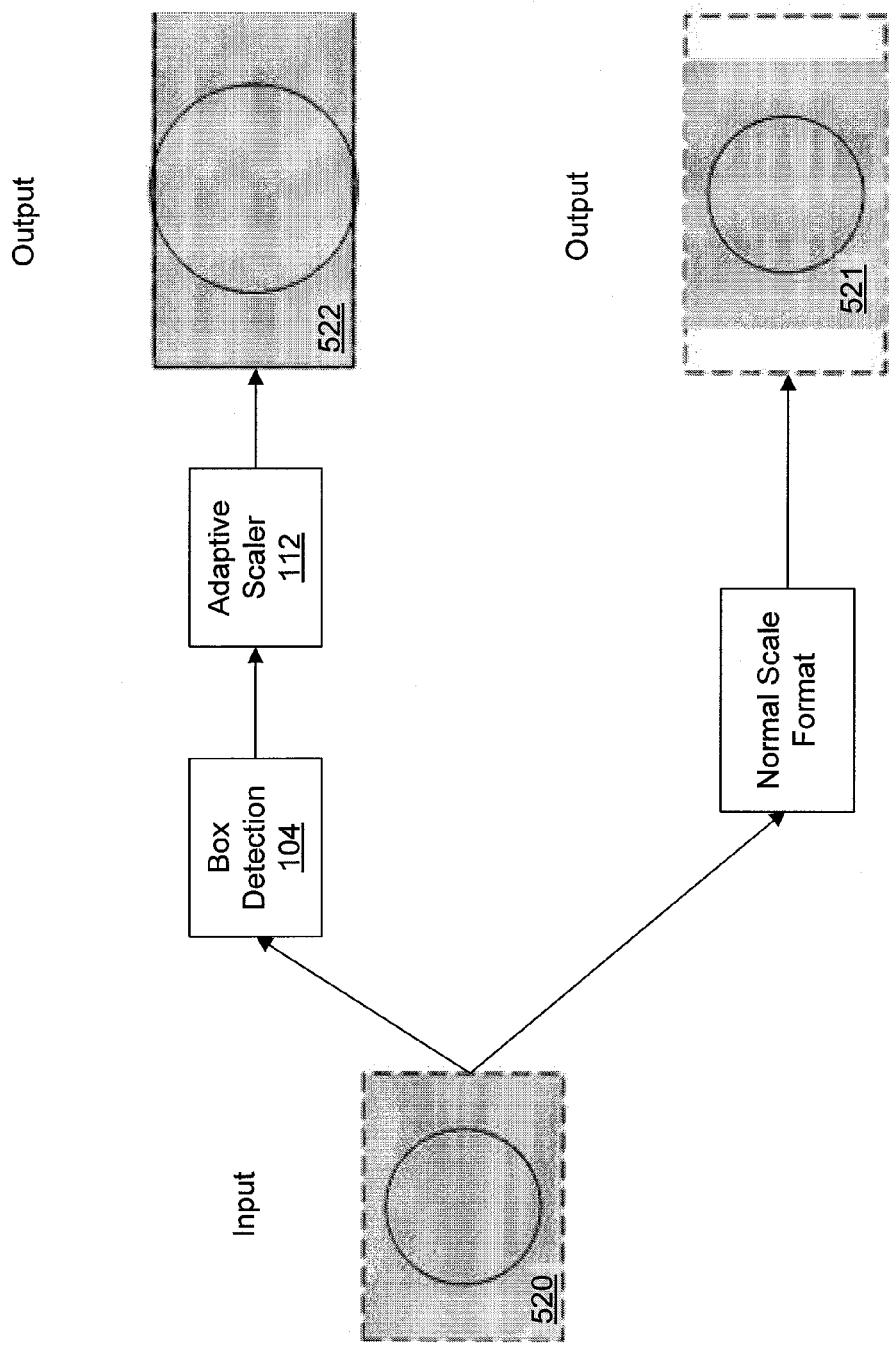
FIG. 5c illustrates a standard definition input video image having 4:3 aspect ratio with 4:3 content.

FIG. 5c illustrates SD input video image 520 having 4:3 aspect ratio with 4:3 content. The description of the output frame 521 compared to output frame 522 is analogous to FIG. 5b, previously described.

Figure 5D:
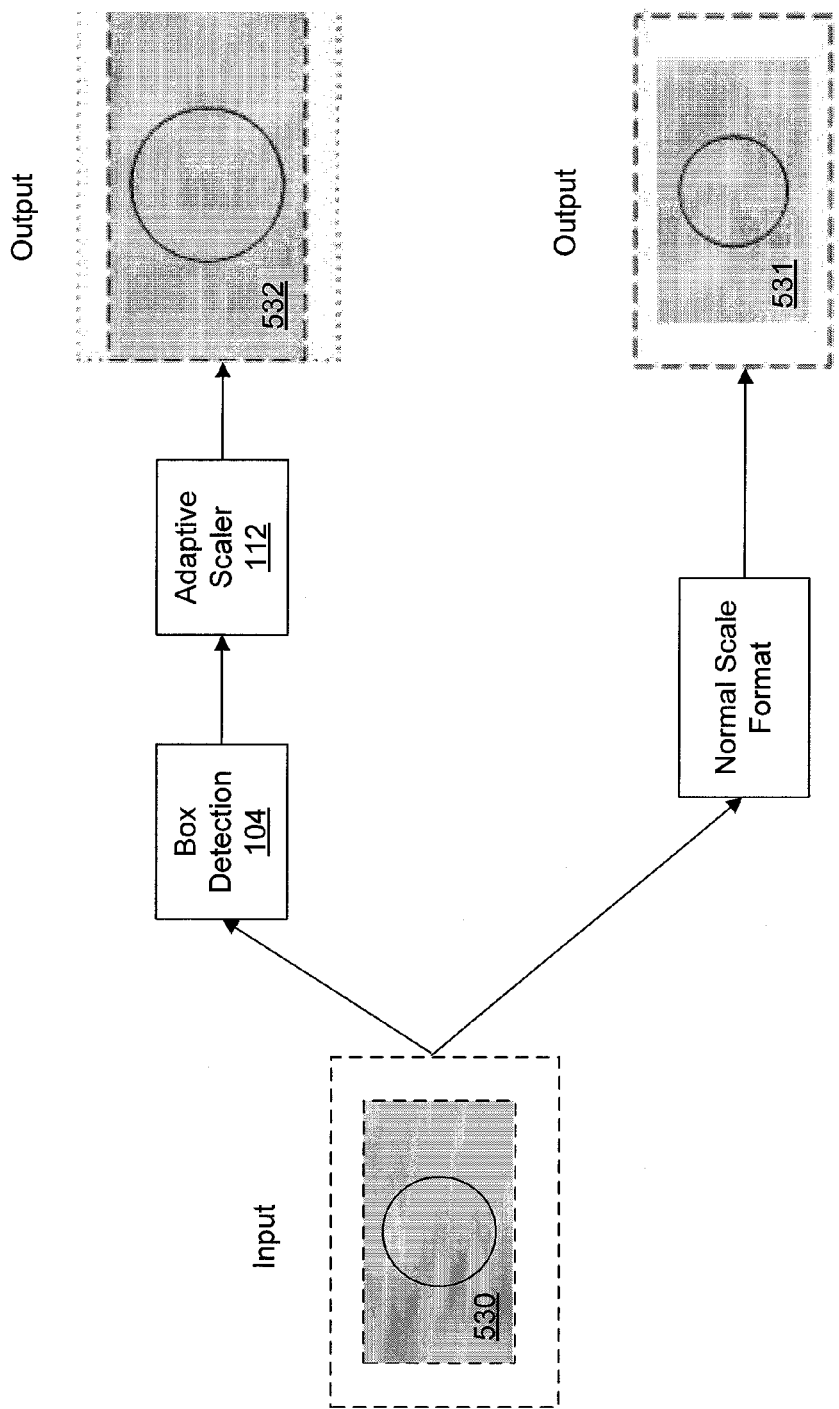
FIG. 5d illustrates a standard definition input video image having 4:3 aspect ratio with 16:9 'letterbox' content.

FIG. 5d illustrates SD input video image 530 having 4:3 aspect ratio with 16:9 'letterbox' content. Frame 531 shows that areas of the display may remain unused when a normally scaled format is used to process input frame 530. Frame 532 shows the result of using box detection 104 and adaptive scaler 112 to adjust input frame 530. Both horizontal and vertical directions are expanded to fill the screen and blank partitions are cropped.

FIGS. 5a-d illustrate that the video display is fully occupied by the image after processing through box detection stage 104 and adaptive scaler stage 112. Thus, an increase in viewing area and resolution may be obtained according to some embodiments of the present invention as depicted in FIGS. 5a-d.

In system 100 of FIG. 1, detail enhancement stage 113 is intended for extraction and enhancement of fine details in the frame. With a low quality source, stage 113 may avoid enhancement of noise and artifacts. In some embodiments of the present invention, based on the classification results received by stage 113 from stage 103, detail enhancement stage 113 may adaptively adjust the image enhancement to be low, for 'low' quality sources; high, for 'medium' quality sources; and medium, for 'high' quality sources. With varying adjustments to quality level, a more consistent visual quality, appearance, and sharpness is obtained. Furthermore, this scheme of opposing adjustments to quality level avoids amplification of noise artifacts in low quality signals and prevents over-shooting the sharpness of high quality signals. In some embodiments of the present invention, detail enhancement function 113 can be gated by the area detected in box detector 104 to avoid enhancing noise or artifacts in the detected borders. In some embodiments of the present invention, detail enhancement stage 113 may have multiple or varying spectral bands of enhancement that may be adjusted according to spectral histogram 102 and image classification 103.

Contrast enhancement stage 114, shown in FIG. 1, performs adaptive contrast enhancement based on source luminance histogram 105. In some embodiments of the present invention, contrast enhancement stage 114 provides additional contrast adjustment according to the image classification results. Low quality content tends to have low contrast and a flat appearance. The amount of contrast enhancement can be increased when 'low' quality content is identified, or be normal when 'medium' or 'high' quality content is identified. In some embodiments, contrast enhancement stage 114 can be gated within the area detected by box detector 104, avoiding enhancement of the detected borders. Furthermore, if luminance histogram 105 shows low luminance distribution, the distribution may be equalized by remapping the luminance levels to broaden the spectrum. Equalization may result in the improvement of the contrast and detail in the portion of the frame being enhanced. For example, in an equalization procedure according to some embodiments of the present invention, a luminance peak located in a medium luminance region of the histogram may be expanded equally towards darker luminance regions and brighter luminance regions. This would result in an expanded contrast with brightness being the same in the area of pixels represented by the medium luminance peak. For luminance peaks located in a brighter luminance region of the histogram, equalization may result in reducing the brightness of the peak while expanding the contrast. Furthermore, for a luminance peak located in a darker luminance region of the histogram, equalization may result in brightening and expanding the contrast in the area of pixels represented by the peak.

Figure 6:
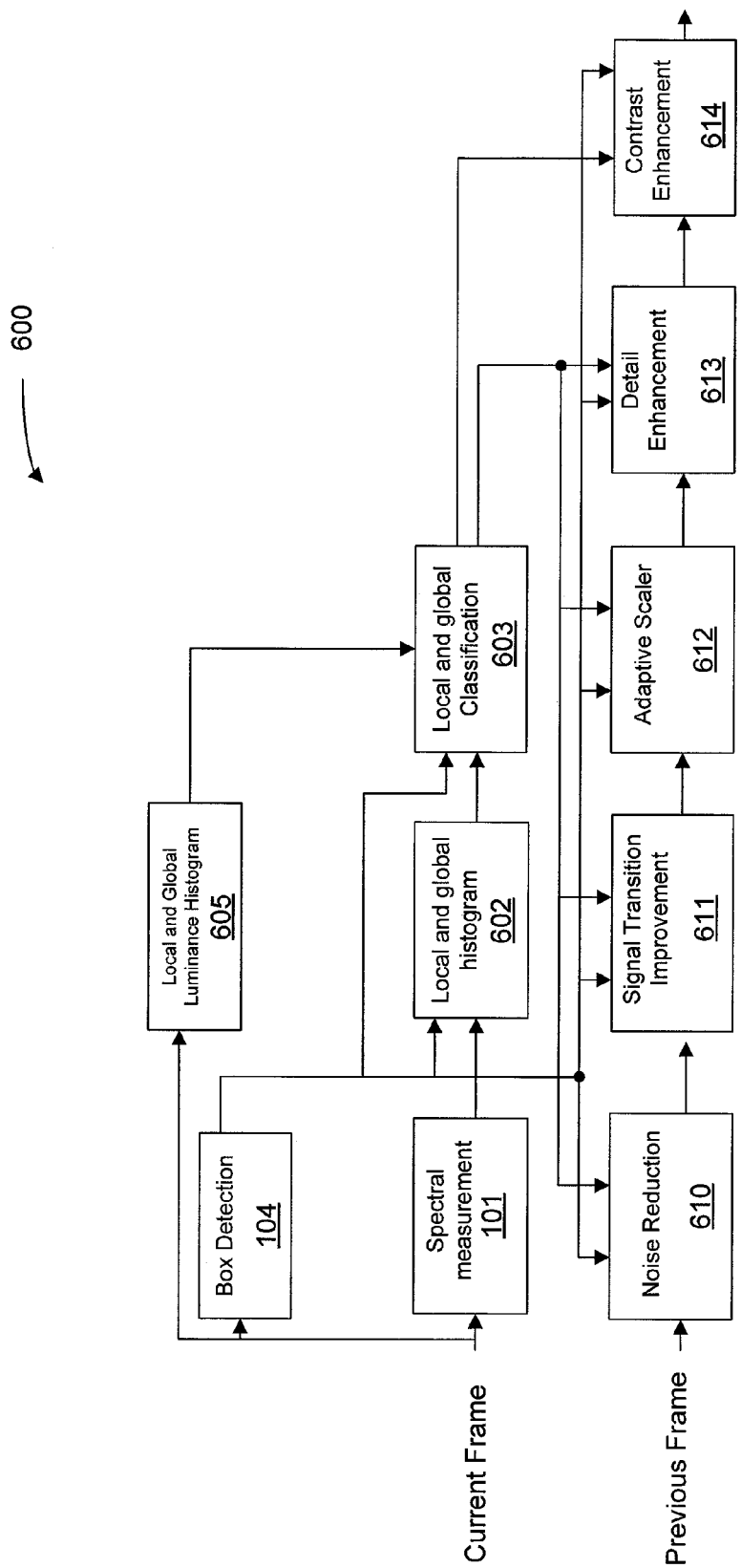
FIG. 6 shows a block diagram of a system using local histogram and local classification, according to some embodiments of the present invention.

FIG. 6 illustrates another system 600 according to some embodiments of the present invention. In system 600 image classifications may be enhanced by partitioning the measurements over regional areas with separate histograms for each region. The embodiment depicted in FIG. 6 includes local and global histogram stage 602, local and global classification stage 603, local and global luminance histogram 605. The local measurements obtained in stages 602, 603, and 605 provide greater sensitivity to local content and can be used to perform local image enhancements. In some embodiments of the present invention, local classification stage 603 may be extended to support pixel per pixel, content-adaptive processing.

Local and global histogram stage 602 may be obtained using spectral measurement stage 101. Stage 603 may perform global image classification according to the description of block 103 (cf. FIG. 1). Also, stage 603 may perform local image classification by sub-frame or regional measurement to support local histogram 602. In some embodiments of the present invention, local histogram 602 can be modified to provide sequential output of local and global histograms to support both the global and the local image classification at stage 603. The spectral bands used to obtain the histogram at stage 602 may be the same as the base embodiment, or modified spectral bands, or may include additional spectral bands to enable the additional functionality. For the embodiment depicted in FIG. 6, parallel spectral band filtering is implemented for global image classification and new spectral bands may be added for local image classification. As mentioned above, some embodiments of the invention may include a local image classification that is a pixel by pixel classification.

Local classification in local and global classification stage 603 may analyze and filter the local histogram output from stage 602 to generate a map that classifies the content type for each source pixel, according to some embodiments of the present invention. The data processed according to stage 603 is used in any or all of enhancement stages. The classification map may be scaled up or down by adaptive scaler 612, according to input and output image formats.

In some embodiments of the present invention, image classification stage 603 evaluates the luminance and spectral histogram data within a selected pixel region to determine image quality. Further, stage 603 may be implemented by software previously programmed on a microprocessor and stored in memory.

Adding local classification at stage 603, a higher level of adaptation of image enhancement may be obtained. For example, image enhancement can be performed regionally or on a per pixel level. Regional classification such as 'flat', 'detailed', and 'edge area' can be determined by a spectral band selection and a local histogram result. Local classification on a current video frame may be correlated with local classification performed on a previous video frame. Thus, identification of motion or temporal noise in the image is enabled by using autocorrelation or cross-correlation techniques.

Embodiments of the invention described above are exemplary only. One skilled in the art may recognize various alternative embodiments from those specifically disclosed. Those alternative embodiments are also intended to be within the scope of this disclosure. As such, the invention is limited only by the following claims.

What is claimed is:

1. A method for adaptive image enhancement, comprising:
measuring an image quality of a pixel region in a frame in a source video;
performing an image classification of the pixel region based on the measured image quality; and
enhancing the image quality of the pixel region by applying operations based on the image classification of the pixel region;
wherein measuring the image quality of the pixel region comprises:
performing a spectral decomposition of the pixel region into one or more spectral bands;
measuring and evaluating a histogram of the spectral bands of the pixel region;
assigning an image quality class to the pixel region; and
adjusting parameters of one or more image enhancement steps selected from the group consisting of a noise reduction step, a signal transition improvement step, an adaptive scaling step, a detail enhancement step, and a contrast enhancement step.

2. The method of claim 1, wherein the pixel region is coextensive with the frame.

3. The method of claim 1, wherein the pixel region is selected from the frame, as any sub-frame contained within the frame, wherein a sub-frame can be any size from a single pixel within the frame to the frame itself.

4. The method of claim 1, wherein performing a spectral decomposition of the pixel region further comprises:
filtering with M spectral band filters for coverage of N spectral bands, where N is a number equal to or greater than 1, and M is equal to or less than N;
segmenting the frame into M sub-frames for filtering by the M spectral band filters;
changing the parameters and measurement histograms of the M spectral band filters for each of the N spectral bands to filter a next image frame until all N spectral bands have been measured;
shifting the spectral band filters sequentially over the sub-frames until each filter has sequenced through all sub-frames in the frame; and
accumulating the histogram of each spectral band for a plurality of frames.

5. The method of claim 1, wherein measuring and evaluating the histogram of the spectral bands comprises using a band measurement threshold power and the band measurement threshold power being selected from a group consisting of a ratio of absolute power level to filter noise power and a quantization-induced band power from the spectral band histogram.

6. The method of claim 1, wherein assigning an image quality class comprises using a classification threshold.

7. The method of claim 6 wherein the classification threshold is an absolute spectral band power in one or more spectral bands.

8. The method of claim 6, wherein the classification threshold is a relative ratio of spectral band power to weighted power of one or more spectral bands, and wherein the classification threshold is independent of brightness and contrast.

9. The method of claim 1, wherein performing a spectral decomposition of the pixel region further comprises decomposition of one or more of Y, Cr, and Cb image components in a YCrCb color space.

10. The method of claim 1, wherein performing a spectral decomposition of the pixel region comprises decomposition of one or more components of H, S, and I image components in a HSI color space.

11. The method of claim 1 wherein enhancing the image quality of the pixel region comprises performing a noise reduction step having a noise reduction level, wherein the noise reduction level has reduced strength for high resolution content, and has increased strength for low resolution content.

12. The method of claim wherein performing an image classification of the pixel region frame is implemented on a microprocessor executing software previously stored.

13. The method of claim 1 wherein assigning an image quality class to the pixel region provides greater sensitivity to low contrast and local content, thereby enabling local image enhancement.

14. The method of claim 1, further wherein assigning an image quality class to the pixel region comprises assigning an image quality selected from a group consisting of: a flat pixel region, a detailed pixel region, and an edge area pixel region.

15. The method of claim 1, further wherein assigning an image quality class to the pixel region comprises assigning an image quality class selected from a group consisting of: wide bandwidth, medium bandwidth, and low bandwidth per color component.

16. The method of claim 1, further wherein assigning an image quality class to selected portions of the pixel region comprises selecting an image quality class from the group consisting of: high detail, medium detail, and low detail.

17. The method of claim 1, further wherein assigning an image quality class to the pixel region comprises selecting an image quality class from the group consisting of: high detail, medium detail, and low detail.

18. A method for adaptive image enhancement, comprising:
    measuring an image quality of a pixel region in a frame in a source video;
    performing an image classification of the pixel region based on the measured image quality; and
    enhancing the image quality of the pixel region by applying operations based on the image classification of the pixel region;
    wherein measuring the image quality of the pixel region comprises:
        collecting a luminance histogram of a Y component in a YCrCb color space or an I component in a HSI color space of the pixel region;
        assigning a brightness class and a contrast class to the pixel region; and
        adjusting a gain and an offset of image color components based on the luminance histogram.

19. A method for adaptive image enhancement, comprising:
    measuring an image quality of a pixel region in a frame in a source video;
    performing an image classification of the pixel region based on the measured image quality; and
    enhancing the image quality of the pixel region by applying operations based on the image classification of the pixel region;
    wherein measuring the image quality of the pixel region comprises:
        collecting a luminance histogram of an I component in a HSI color space of the pixel region
        assigning a brightness class and a contrast class to the pixel region; and
        adjusting a gain and an offset of image color components according to the brightness class and the contrast class.

20. A method for adaptive image enhancement, comprising:
    measuring an image quality of a pixel region in a frame in a source video;
    performing an image classification of the pixel region based on the measured image quality; and
    enhancing the image quality of the pixel region by applying operations based on the image classification of the pixel region;
    wherein measuring the image quality of the pixel region further comprises:
        measuring inactive borders of the frame in the source video image;
        assigning an inactive region of the frame in the source video image for alternate image enhancing.

21. The method of claim 20 further wherein the alternate image enhancing step comprises a step selected from the group consisting of a noise reduction step, a signal transition improvement step, a detail enhancement step, and an adaptive scaling step.

22. The method of claim 20 wherein enhancing the image quality of the pixel region comprises a noise reduction step having a noise reduction level; further wherein the noise reduction level is increased in the inactive region, and otherwise adaptive to image classification.

23. The method of claim 20 wherein enhancing the image quality of the pixel region comprises a signal transition improvement step and a detail enhancement step, whereby enhancements are reduced in the inactive region and otherwise adaptive to image classification.

24. The method of claim 20 wherein enhancing the image quality of the pixel region comprises an adaptive scaling step, whereby the scaler bandwidth is reduced in the inactive region to reduce noise and a scale factor is adjusted to optimize displayed area for an active image.

25. The method of claim 20 further wherein enhancing the image quality of the pixel region comprises a contrast enhancement step, whereby a luminance measurement and a brightness and a contrast enhancement is disabled in the inactive region.

26. A method for adaptive image enhancement, comprising:
    dividing a frame in a source video image into P pixel regions, where P is a number greater than 1 and as large as a total number of pixels in an output display; and for each one of the P pixel regions the method further comprising:
        measuring an image quality of the pixel region;
        assigning an image quality class to selected portions of the pixel region; and
        enhancing each of the pixel regions in a frame of a source video image according to their image quality class;

wherein measuring the image quality class of the pixel region comprises:

having the pixel region in the source video image limited by borders;

using a box detector stage to evaluate the borders of the pixel region;

performing a spectral decomposition of the pixel region;

evaluating a histogram of a luminance component in the pixel region; and measuring the image quality of the pixel region based on the spectral decomposition and the luminance histogram.

27. A system for adaptive image enhancement, comprising:

a circuit to measure an image quality of a region of a frame in a source video image;

a circuit to perform an image classification of the region based on the measured image quality; and a circuit to enhance the image quality of the region by applying operations based on the image classification of the region;

wherein the circuit to measure the image quality of the region comprises:

a box detection circuit to evaluate borders of the region;

a circuit to perform a spectral measurement of the region;

a circuit to evaluate a luminance histogram of the region;

a circuit to measure the image quality of the region based on the spectral measurement and the luminance histogram; and a circuit for assigning image classifications to selected portions of the region.

28. A system for adaptive image enhancement, comprising:

a circuit to measure an image quality of a region of a frame in a source video image;

a circuit to perform an image classification of the region based on the measured image quality; and a circuit to enhance the image quality of the region by applying operations based on the image classification;

a circuit to perform noise reduction to the region, according to the image classification;

a circuit to perform signal transition improvement to the noise reduced region, according to the image classification;

a circuit to perform adaptive scaling to the signal transition improved region, according to the image classification and box borders evaluated by a box detection circuit;

a circuit to perform detail enhancement to the adaptively scaled region, according to the image classification; and a circuit to perform contrast enhancement to the detail enhanced region.

\* \* \* \* \*